United States Patent
Wang et al.

(10) Patent No.: US 6,610,370 B2
(45) Date of Patent: Aug. 26, 2003

(54) COATED ARTICLE AND METHOD OF MAKING

(75) Inventors: Hongyu Wang, Niskayuna, NY (US); Kang Neung Lee, Westlake, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/233,359

(22) Filed: Sep. 3, 2002

(65) Prior Publication Data

US 2003/0003329 A1 Jan. 2, 2003

Related U.S. Application Data

(62) Division of application No. 09/299,419, filed on Apr. 26, 1999, now Pat. No. 6,485,848.
(60) Provisional application No. 60/083,158, filed on Apr. 27, 1998.

(51) Int. Cl.$^7$ ................................. C23C 14/30
(52) U.S. Cl. ................. 427/452; 427/453; 427/255.32; 427/372.2; 427/397.7; 427/596; 204/192.16
(58) Field of Search ................. 427/452, 453, 427/255.32, 372.2, 397.7, 596; 204/192.16

(56) References Cited

U.S. PATENT DOCUMENTS

| | | | | |
|---|---|---|---|---|
| 5,281,487 A | * | 1/1994 | Rumaner et al. | ............ 428/552 |
| 5,763,008 A | * | 6/1998 | Sarin et al. | ........... 427/255.395 |
| 5,897,916 A | * | 4/1999 | Kobayashi et al. | .... 427/249.15 |
| 6,197,424 B1 | * | 3/2001 | Morrison et al. | ........... 428/402 |

* cited by examiner

*Primary Examiner*—Timothy Meeks
(74) *Attorney, Agent, or Firm*—Toan P. Vo; Noreen C. Johnson

(57) ABSTRACT

An article includes a silicon-containing substrate and a modified mullite coating. The modified mullite coating comprises mullite and a modifier component that reduces cracks in the modified mullite coating. The article can further comprise a thermal barrier coating applied to the modified mullite coating. The modified mullite coating functions as a bond coating between the external environmental/thermal barrier coating and the silicon-containing substrate. In a method of forming an article, a silicon-containing substrate is formed and a modified mullite coating is applied. The modified mullite coating comprises mullite and a modifier component that reduces cracks in the modified mullite coating.

25 Claims, 4 Drawing Sheets

COATED ARTICLE AND METHOD OF MAKING

This application is a division of U.S. patent application Ser. No. 09/299,419, filed on Apr. 26, 1999, now U.S. Pat. No. 6,485,848, which claims the benefit under 35 U.S.C. 119(e) of provisional patent application having Ser. No. 60/083,158; filed on Apr. 27, 1998.

This invention was made with government support under Contract No. NAS3-26385 awarded by NASA. The government may have certain rights in the invention.

BACKGROUND OF THE INVENTION

The invention relates to an article having at least a modified mullite coating. The invention further relates to a silicon-containing substrate having at least a modified mullite coating. The invention further relates to a silicon-containing ceramic substrate having a modified mullite coating and at least one additional layer of material.

Silicon-containing materials have been proposed for structures used in high temperature applications, such as in heat exchangers and advanced internal combustion engines. For example, silicon-based composite ceramics have been proposed as materials for applications in combustors for commercial airplanes. However, these ceramic materials exhibit poor oxidation resistance in reducing atmospheres and in environments containing salts, water vapor or hydrogen. Hence, it is necessary to apply environmental barrier coatings to the silicon-containing materials to provide protection from environmental attack at elevated temperatures and to apply thermal barrier coatings to extend the life at elevated temperatures.

Mullite has been proposed as a material for environmental barrier coatings as well as thermal barrier coatings on silicon-containing materials. Mullite exhibits low thermal conductivity. It has low density and a high melting point. However, mullite coatings tend to develop cracks perpendicular to substrates and through the thickness of the coating. These cracks are detrimental to the functions of the mullite coating because they serve as transport paths for corrosive species causing severe oxidation and corrosion at the interface between the coating and substrate. Additionally, cracks in the coating concentrate stresses. The cracks apply shear and tensile forces on the substrate to cause substrate fractures.

Since the crack openings increase with increasing distance from the mullite substrate interface, the cracks may be the result of the difference in thermal expansion between the mullite coating and the silicon-containing substrate. FIG. 1 shows differences in the coefficient of thermal expansion (CTE) of mullite, silicon carbide (SiC) and silicon (Si). Thus, there is a need to provide coatings or layers to silicon-containing substrates that act at least as environmental barrier coatings having reduced cracks.

SUMMARY OF THE INVENTION

The present invention is based on the discovery that a modifier component can be added to a mullite coating to reduce cracks in the coating applied to a silicon-containing substrate. The mullite coating with the modifier component is also referred to as a modified mullite coating. The modified mullite coating reduces fracture at the interface of the mullite coating and the silicon-containing substrate.

In one aspect, the invention is an article comprising a silicon-containing substrate and a modified mullite coating. The modified mullite coating comprises mullite and a modifier component that reduces cracks, including through-thickness cracks, in the mullite coating. Preferably, the modifier component comprises a component having a lower thermal expansion than the mullite coating. As a result, the modifier component imparts a lower thermal expansion coefficient to the mullite coating. The article can further comprise an external environmental/thermal barrier coating applied to the modified mullite coating. The modified mullite coating then functions as a bond coat between the external environmental/thermal barrier coating and the silicon-containing substrate.

In another aspect, the invention relates to a method of forming an article with at least a modified mullite coating. In the method, a silicon-containing substrate is formed and a modified mullite coating is applied. The modified mullite coating comprises mullite and a modifier component that reduces cracks in the coating.

DETAILED DESCRIPTION OF THE INVENTION

Figure 1:
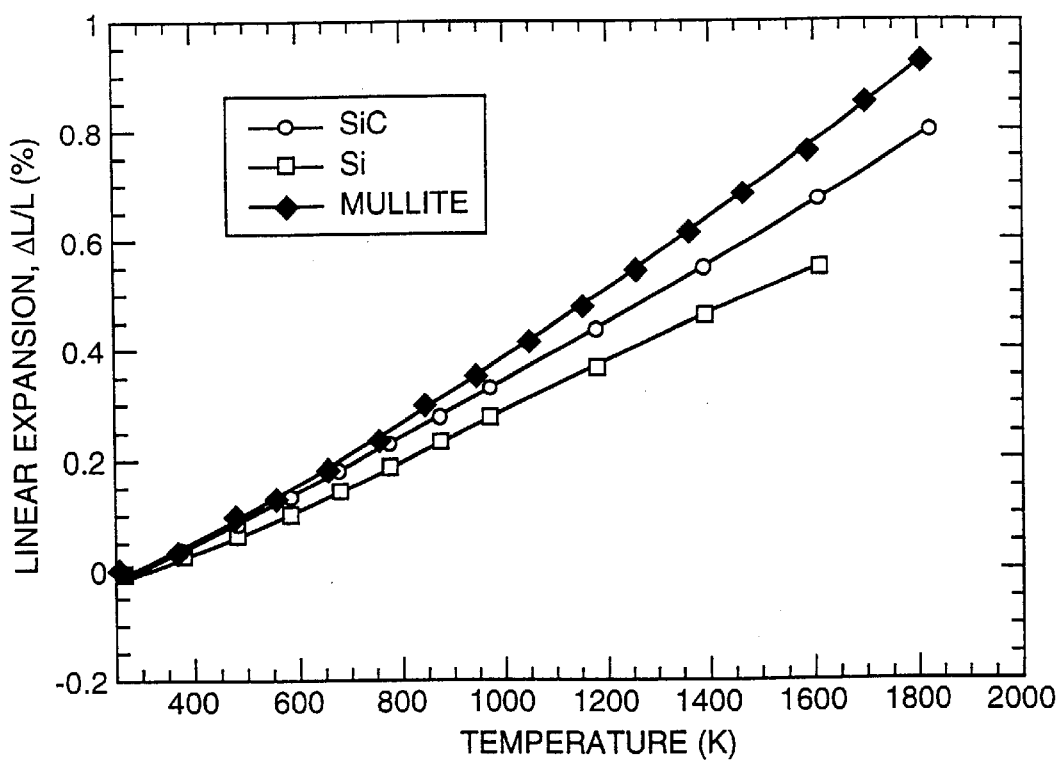
FIG. 1 is a graph illustrating comparative coefficient of thermal expansions for mullite, silicon carbide and silicon.

According to the invention, a modifier component is added to a mullite coating to reduce or eliminate cracks, including through-thickness cracks. By through thickness-cracks is meant cracks that extend substantially through the entire thickness of the mullite coating from near the top surface to near the bottom of the coating or near the silicon-containing substrate. The modifier components can be categorized into one or more of at least three functional groups. (1) The modifier component imparts a closer coefficient of thermal expansion (CTE) match between the modified mullite coating and silicon-containing substrate than the coefficient of thermal expansion match between the mullite coating without the modifier and the silicon-containing substrate. (2) The modifier component provides a phase or phases that reduce the overall elastic modulus of the modified mullite coating to reduce thermal stress in said coating. (3) The modifier component provides a phase or phases that serve as crack arresters to increase resistance of the modified mullite coating to crack propagation. The modifer component increases the toughness of the modified mullite coating.

The modified mullite coating is applied to a silicon-containing substrate. Suitable silicon-containing substrates comprise materials that result in cracking of an applied mullite coating. The silicon-containing substrate can comprise a ceramic such as a silicon-based ceramic. Examples are silicon carbide, silicon nitride, silicon carbon nitride, silicon oxynitride, and the like. The silicon-containing ceramic substrate can be a monolith or composite. A composite can comprise a silicon, silicon carbide, carbon or mixtures thereof reinforcing fibers, particulate or whiskers and a silicon-based matrix. The fibers, particulate and whiskers generally have at least one outer coating, such as silicon carbide, silicon boride, silicon nitride and the like. The matrix can be processed by melt infiltration (MI), chemical vapor infiltration (CVI) or other technique. Exemplary silicon-containing substrates include a monolithic silicon carbide and silicon nitride substrate, a silicon carbide fiber-reinforced silicon carbide matrix composite, carbon fiber-reinforced silicon carbide matrix composite, and a silicon carbide fiber-reinforced silicon nitride composite. The preferred substrate comprises a silicon carbide fiber-reinforced silicon-silicon carbide matrix composite processed by silicon melt infiltration.

Also suitable as silicon-containing substrates are silicon metal alloys. These alloys include niobium silicon alloys, molybdenum silicon alloys and the like.

The coated article of the invention can comprise a thermal barrier coating applied to the modified mullite coating. Suitable external environmental/thermal barrier coatings include chemically stabilized zirconias, such as yttria-stabilized zirconia, scandia-stabilized zirconia, calcia-stabilized zirconia and magnesia-stabilized zirconia, alumina and alumina silicate. Preferred external environmental/thermal barrier coatings in this invention include yttria-stabilized zirconia (YSZ), barium strontium aluminosilicate (BSAS), calcium aluminosilicate (CAS) and yttrium silicates (YS).

The modified mullite coating of the invention comprises mullite and a modifier component that reduces cracks in the modified mullite coating. Mullite is a stable form of aluminum silicate found naturally or formed by heating other aluminum silicates such as cyanite, sillimanite and andalusite, to high temperature. Mullite is an excellent high temperature material (incongruent melting temperature about 1830 C.) with high corrosion resistance, high thermal shock resistance and chemical stability at high temperatures, such as up to about 1700 C. It is the only stable crystalline compound in the aluminum silicate system under normal atmospheric pressure. It has a chemical composition ranging from $3Al_2O_3.2SiO_2$ (71.8 wt % $Al_2O_3$) (3/2 mullite) to approximately $2Al_2O_3.SiO_2)_2$ (77.3 wt % $Al_2O_3$)(2/1 mullite). It crystallizes in the orthorhombic system. It has a melting point of 1850 C. and a coefficient of thermal expansion of $5.62 \times 10^{-6}$/C. in the 25–1500 C. range. In the absence of glassy inclusions, mullite retains greater than 90% of its room temperature strength to 1500 C. and displays very high creep and thermal shock resistance.

Examples of suitable modifier components of the modified mullite coating include alkaline earth aluminosilicates, preferably with the formula $MO.Al_2O_3.2SiO_2$, where M is an alkaline earth element. Preferred modifier components of the formula $MO.Al_2O_3.2SiO_2$ include barium feldspar ($BaO.Al_2O_3.2SiO_2$), strontium feldspar ($SrO.Al_2O_3.2SiO_2$), and combinations of barium feldspar ($BaO.Al_2O_3.2SiO_2$), and strontium feldspar ($SrO.Al_2O_3.2SiO_2$). Preferably, the alkaline earth aluminosilicate has a monoclinic celsian crystalline phase. Most preferred aluminosilicates include $(BaO)_{0.75}(SrO)_{0.25}.Al_2O_3.2SiO_2$ referred to as BSAS, $CaO.Al_2O_3.2SiO_2$ referred to as CAS and $BaO.Al_2O_3.2SiO_2$. Other suitable modifiers include materials referred to as NZP's such as $NaZr_2P_3O_{12}$, $Ba_{1.25}Zr_4P_{5.5}Si_{0.5}O_{2.4}$, $Ca_{0.5}Sr_{0.5}Zr_4(PO_4)_6$ and $Ca_{0.6}Mg_{0.4}Sr_4(PO_4)_6$. Other preferred modifier components include yttrium silicates, calcium aluminates including $3Ca_{0.5}.5Al_2O_3$, aluminum titanates including $Al_2O_3.TiO_3$, cordierite ($2MgO.Al_2O_3.5 SiO_2$), fused silica ($SiO_2$) and silicon (Si). These materials are also chemically compatible with mullite.

The modifier components may be added to the modified mullite coating in a percent volume range between about 5 to about 50. Preferably, the modifier component is present in about 10 to about 30 volume percent of the modified mullite coating and most preferably in about 15 to 25 volume percent.

In the group (1) modifier components, a coefficient of thermal expansion is imparted to the modified mullite coating that is closer to the coefficient of thermal expansion of the silicon-containing substrate. The coefficient of thermal expansion of a polycrystalline composite material is determined by the volume fractions of its constituents. The coefficient of thermal expansion can generally be approximated by using the rule of mixture:

$$\underline{a}_c = \underline{a}_1 V_1 + \underline{a}_2 V_2 + \ldots \underline{a}_i V_i$$

where $\underline{a}_c$ is the coefficient of thermal expansion of the composite, and $\underline{a}_1$, $\underline{a}_2$ and $\underline{a}_i$ and $V_1$, $V_2$ and $V_i$ are the coefficient of thermal expansions and volume fractions of phases 1, 2 and i, respectively. Therefore, adding a phase or phases with lower coefficient of thermal expansion to a material will result in a composition that has a lower coefficient of thermal expansion than the starting material. To duplicate the coefficient of thermal expansion of the silicon-containing substrate, the volume faction of the modifier component in the modified mullite coating should be proportionate to the ratio of the difference between the coefficient of thermal expansion of the silicon-containing substrate and the coefficient of thermal expansion of the mullite to the difference between the coefficient of thermal expansion of the modifier component and the coefficient of thermal expansion of the mullite.

Figure 2:
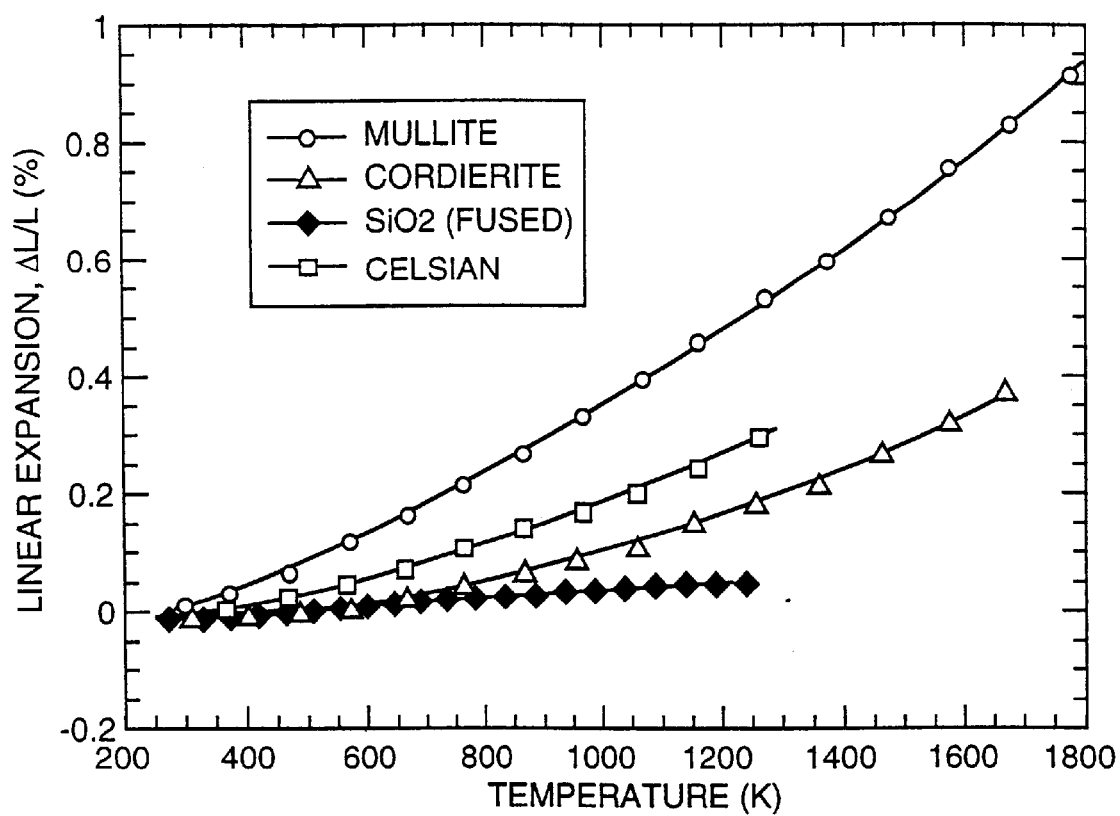
FIG. 2 is a graph illustrating comparative coefficient of thermal expansions for mullite, cordierite, fused silica and celsian ($BaO.Al_2O_3.2SiO_2$).

A comparison of coefficient of thermal expansion of mullite with the coefficient of thermal expansions of cordierite, fused silica and celsian ($BaO.Al_2O_3.2SiO_2$) is illustrated in FIG. 2. According to the invention, co-depositing mullite with a low thermal expansion modifier component such as cordierite, fused silica or celsian ($BaO.Al_2O_3.2SiO_2$) on silicon or silicon-containing ceramic substrates or ceramic composite substrates imparts an improved thermal expansion match of the modified mullite coating with the silicon-containing substrate than with a monolithic mullite coating.

Cordierite is an incongruently melting compound with mullite formed first when cooling from the liquid phase. Upon quenching form the melt splash during the plasma spray, it may remain as a glassy material or mullite with a glass phase. This may require a post-spray annealing process at appropriate temperatures to convert the material to cordierite. The amount of modifier component addition can be first estimated by the rule of mixture estimate. But because of the complexity of phase composition in the system, a trial and error process may have to be executed before an optimal proportion is reached.

The mullite coating with the modifier component can be applied to the silicon-containing substrate by any suitable method including thermal spray, air plasma spray (APS) and vacuum or low pressure plasma spray (VPS or LPPS), high velocity oxy-fuel (HVOF) spray, vapor deposition, including chemical vapor deposition (CVD), physical vapor deposition (PVD) and solution techniques such as sol-gel, slurry coating or colloidal suspension coating. A constituent starting powder of the mullite coating and modifier component may be premixed through a vigorous mechanical process, such as ball milling, to provide interlocking of the powders and prevent segregation of phases due to density differences. For the same purpose, a sol-gel or colloidal process may be employed to coat the particles of one constituent with another.

Sarin et al., U.S. Pat. No. 5,763,008 and Lee et al., U.S. Pat. No. 5,496,644 describe exemplary methods of applying mullite coatings. The disclosures of these patents are incorporated herein by reference. Sarin et al discloses a chemical deposition process comprising steps of establishing a flow of reactants which will yield mullite in a CVD reactor, and depositing a crystalline coating from the reactant flow. Lee et al. discloses a method of plasma spraying mullite coatings onto silicon-based ceramic materials. The method prevents deposition of amorphous mullite by heating the silicon-containing substrate to a very high temperature (greater than 1000 C.) during the spraying process.

The following examples are illustrative of the invention.

EXAMPLES

Powders of $CaO.Al_2O_3.2SiO_2$ (CAS) (22 vol %) and $(BaO)_{0.75}(SrO)_{0.25}.Al_2O_3.2SiO_2$ (BSAS) (18 vol %) were added to mullite powder by ball milling, respectively. The composite powders were sprayed using air plasma spray (APS) onto a silicon carbon fiber reinforced silicon carbide-silicon matrix composite substrate processed by melt infiltration. The substrate temperature was kept at 1050 to 1250 C. The plasma torch model was Electro-plasma 03CA, with 45 kW power, argon (14.4 SLM) as primary gas and helium (9.8 SLM) as secondary gas. Plasma torch to substrate distance was 4". A top coat of yttria-stabilized zirconia (YSZ) was applied on top of the composite mullite coating by air plasma spray using standard operating procedures for thermal barrier coatings. A baseline sample of monolithic mullite coating on the ceramic composite substrate was also prepared using the thermal spray technique with a yttria-stabilized zirconia topcoat.

Samples of silicon-containing ceramic substrates with the modified mullite and thermal barrier coatings and monolithic mullite coatings were subjected to an environmental furnace test with two hour cycles from room temperature to 1300 C. for 500 hours in $90\%H_2O$ $10\%O_2$. The results are shown in FIGS. 3–5.

Figure 3:
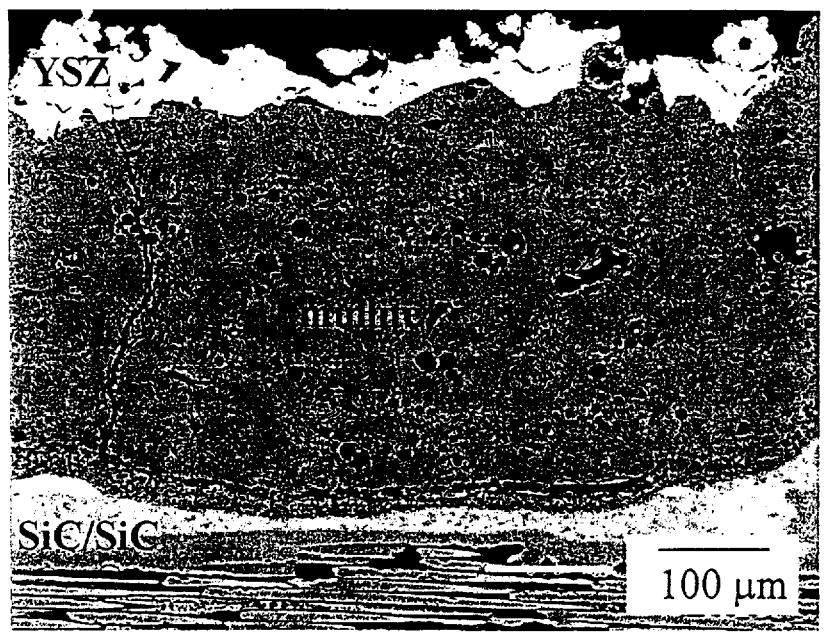
FIG. 3 is a photomicrograph for a mullite and yttria stabilized zirconia-coated silicon carbide/silicon carbide composite.

FIG. 3 shows that through-thickness cracks developed in the baseline sample with the monolithic mullite coating. Extensive oxidation of the silicon-based ceramic composite at the mullite/substrate interface resulted in failure of the mullite coating (environmental barrier coating) during the test.

Figure 4:
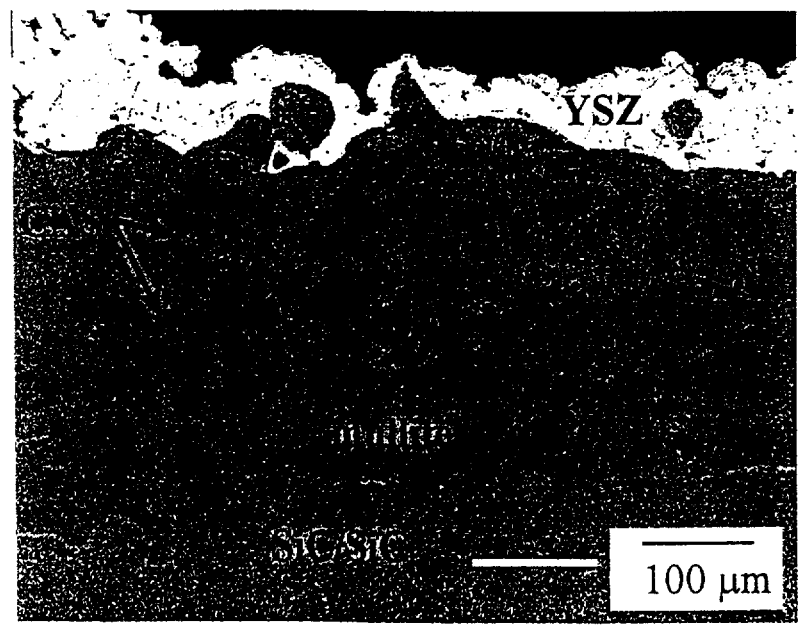
FIG. 4 is a photomicrograph for a mullite with twenty-two volume percent calcium aluminosilicate and a yttria stabilized zirconia-coated silicon carbide/silicon carbide composite.
Figure 5:
FIG. 5 is a photomicrograph for a mullite with eighteen volume percent barium strontium aluminosilicate and a yttria stabilized zirconia-coated silicon carbide/silicon carbide composite.

In contrast, the composite modified mullite coatings shown in FIGS. 4 and 5 exhibited no through-thickness cracks in the modified mullite coating and the coatings survived the test with minimal change at the modified mullite coating/substrate interface.

What is claimed:

1. A method of forming an article, comprising: forming a silicon-containing substrate; and applying a modified mullite coating comprising mullite and a modifier component that reduces cracks in the modified mullite coating, wherein said modifier component comprises an alkaline earth aluminosilicate.

2. The method of claim 1, further comprising annealing said modified mullite coating to convert a glass phase of said modifier component to a phase compatible with said mullite.

3. The method of claim 1, further comprising applying an external environmental/thermal barrier coating onto said modified mullite coating.

4. The method of claim 1, wherein said modifier component comprises a lower thermal expansion component than mullite that imparts a closer coefficient of thermal expansion match between said modified mullite coating and said silicon-containing substrate.

5. The method of claim 1, wherein said modifier component forms a phase in said modified mullite coating that reduces thermal stress in the modified mullite coating by reducing the elastic modulus of said modified mullite coating.

6. The method of claim 1, wherein said modifier component forms a phase in said modified mullite coating that arrests the propagation of cracks in said modified mullite coating.

7. The method of claim 1, wherein said modifier component comprises barium feldspar ($BaO.Al_2O_3.2SiO_2$), strontium feldspar ($SrO.Al_2O_3.2SiO_2$) or a combination of barium feldspar ($BaO.Al_2O_3.2SiO_2$), and strontium feldspar ($SrO.Al_2O_3.2SiO_2$).

8. The method of claim 1, wherein said modifier component comprises a monoclinic celsian crystalline phase.

9. The method of claim 1, wherein said modifier component comprises barium strontium aluminosilicate (BSAS), calcium aluminosilicate (CAS), or a combination thereof.

10. The method of claim 1, wherein said modifier component comprises cordierite ($2MgO.2Al_2O_3.5SiO_2$).

11. The method of claim 1, comprising adding a volume fraction of the modifier component in the modified mullite coating proportionate to a ratio of a difference between a coefficient of thermal expansion of the silicon-containing substrate and the coefficient of thermal expansion of a mullite to a difference between a coefficient of thermal expansion of the modifier component and the coefficient of thermal expansion of the mullite.

12. The method of claim 1, comprising applying said modified mullite coating by thermal spray, high velocity oxy-fuel (HVOF) spray, vapor deposition, physical vapor deposition (PVD) or solution technique.

13. The method of claim 1, comprising applying said modified mullite coating by air plasma spray, vacuum plasma spray or low pressure plasma spray.

14. The method of claim 1, comprising applying said modified mullite coating by chemical vapor deposition.

15. The method of claim 1, comprising applying said modified mullite coating by sol-gel, slurry coating or colloidal suspension coating.

16. The method of claim 1, comprising forming the modified mullite coating by first forming a starting powder of the coating and modifier component by ball milling.

17. The method of claim 1, comprising forming the modified mullite coating by a sol-gel or colloidal process.

18. A method of forming an article, comprising: forming a silicon-containing substrate; and applying a modified mullite coating comprising mullite and a modifier component that reduces cracks in the modified mullite coating, said modifier component comprising a material having a formula of $MO.Al_2O_3.2SiO_2$, where M is an alkaline earth element.

19. A method of forming an article, comprising: forming a silicon-containing substrate; and applying a modified mullite coating comprising mullite and a modifier component that reduces cracks in the modified mullite coating, wherein said modifier component comprises an NZP modifier.

20. The method of claim 19, wherein said modifier component comprises $NaZr_2P_3O_{12}$, $Ba_{1.25}Zr_4P_{5.5}Si_{0.5}O_{2.4}$, $Ca_{0.5}Sr_{0.5}Zr_4(PO_4)_6$ or $Ca_{0.6}Mg_{0.4}Sr_4(PO_4)_6$.

21. A method of forming an article, comprising: forming a silicon-containing substrate; and applying a modified mullite coating comprising mullite and a modifier component that reduces cracks in the modified mullite coating, said modifier component comprising a calcium aluminate or an aluminum titanate.

22. The method of claim 21, wherein said modifier component comprises $3Ca0.5.5\ Al_2O_3$, or $Al_2O_3.TiO_3$.

23. A method for making a coated article comprising forming a silicon/silicon carbide composite having silicon carbide-containing fibers; applying a modified mullite coating comprising mullite and barium strontium aluminosilicate (BSAS), that reduces cracks in the modified mullite coating.

24. The method of claim 23 further comprising applying a yttria-stabilized zirconia coating to the modified mullite coating.

25. A method of forming an article, comprising: forming a silicon-containing substrate; and applying a modified mullite coating comprising mullite and a modifier component that reduces cracks in the modified mullite coating, said modifier component comprising yttrium silicate.

* * * * *